United States Patent
Miyazaki et al.

(10) Patent No.: US 6,935,008 B2
(45) Date of Patent: Aug. 30, 2005

(54) METHOD FOR MAKING METALLIC CORD

(75) Inventors: Shinichi Miyazaki, Kobe (JP); Osamu Toda, Kobe (JP); Yuichi Sano, Utsunomiya (JP)

(73) Assignees: Sumitomo Rubber Industries, LTD, Hyogo-ken (JP); Sumitomo Electric Industries, LTD, Osaka-fu (JP)

( * ) Notice: Subject to any disclaimer, the term of this patent is extended or adjusted under 35 U.S.C. 154(b) by 453 days.

(21) Appl. No.: 10/247,541

(22) Filed: Sep. 20, 2002

(65) Prior Publication Data

US 2003/0110612 A1 Jun. 19, 2003

(30) Foreign Application Priority Data

Sep. 20, 2001 (JP) .................................. 2001-287622
Sep. 20, 2001 (JP) .................................. 2001-287623

(51) Int. Cl.⁷ ................................................ B23P 17/00
(52) U.S. Cl. ...................... 29/424; 29/527.2; 152/556; 152/451
(58) Field of Search ..................... 29/424, 469.5, 29/527.2; 152/556, 451

(56) References Cited

U.S. PATENT DOCUMENTS

| | | | | |
|---|---|---|---|---|
| 4,018,570 A | * | 4/1977 | Nakamoto et al. | 152/451 |
| 4,226,918 A | * | 10/1980 | Friend | 152/451 |
| 4,828,000 A | * | 5/1989 | Lievens et al. | 152/451 |
| 4,978,586 A | * | 12/1990 | Chambaere et al. | 428/625 |
| 5,389,163 A | * | 2/1995 | Hachisuka | 148/532 |
| 6,475,640 B1 | * | 11/2002 | Doujak et al. | 428/626 |

FOREIGN PATENT DOCUMENTS

| | | |
|---|---|---|
| EP | 0 009 846 A | 4/1980 |
| EP | 0 188 036 B | 4/1989 |
| EP | 0 547 582 A | 6/1993 |
| EP | 0 343 254 B | 6/1994 |
| EP | 1 004 689 A | 5/2000 |

OTHER PUBLICATIONS

Starinshak et al., "Engineering Brass Coatings By Sequentinal Plating", Chemical Abstracts and Indexes, Americal Chemical Society, vol. 109, No. 12, Sep. 1, 1988, p. 515, XP000018644.

Patent Abstracts of Japan, vol. 007, No. 147 (c–173), Jun. 28, 1983.

Patent Abstracts of Japan, vol. 1997, No. 04, Apr. 30, 1997.

* cited by examiner

*Primary Examiner*—David P. Bryant
(74) *Attorney, Agent, or Firm*—Birch, Stewart, Kolasch & Birch LLP

(57) ABSTRACT

A method for making a metallic cord made up of one or more metallic wires comprises: making at least two layers of at least two metallic elements including copper and zinc on the surface of a base wire; heating the layers to cause the metallic elements thermodiffusion to transform into a primary alloy layer; making a layer of copper on the primary alloy layer; drawing the wire provided with the primary alloy layer and outer copper layer into a metallic wire through dies so that the outer copper layer is diminished during passing through the dies, and a secondary alloy layer is formed as a result of transformation of the primary alloy layer and the outer copper layer which is caused by frictional heat during passing through the dies.

6 Claims, 4 Drawing Sheets

METHOD FOR MAKING METALLIC CORD

The present invention relates to a method for making a metallic cord made up of one or more metallic wires.

In various rubber products such as pneumatic tires, steel cords are widely used to reinforce rubber parts such as a carcass and tread belt of a large tire, a tread belt of a passenger car tire and the like.

As the adhesion of steel itself to rubber is not good, steel cords are conventionally coated with brass in order to improve adhesion to rubber. During vulcanizing the rubber, copper included in brass reacts with sulfur included in the rubber and a sulphide is produced between the surface of the wire and rubber and as a result the adhesion is improved.

However, if such a rubber product is exposed to hot and high humidity conditions for a long stretch of time, the adhesion is gradually decreased, and separation of steel cords and rubber becomes liable to occur. Thus, such adhesion after undergone hot and high humidity conditions for a long time (hereinafter the "high-temperate and high-humidity adhesion") and the adhesion at the initial stage after vulcanization of rubber is finished (hereinafter the "initial adhesion") should be considered distinctively from each other.

The "high-temperate and high-humidity adhesion" may be prevented from decreasing by decreasing the copper content to control the formation of sulphide. In general, however, as the copper content decreases, the spreadability of brass decreases and the drawability of the wire becomes worse. If the copper content of brass is less than 62%, it becomes very difficult to draw the wire. Therefore, conventionally, the copper content is set in a range of from 63 to 70% at the sacrifice of high-temperate and high-humidity adhesion.

It is therefore, an object of the present invention to provide a method for making a metallic cord in which the drawability of metallic wire is improved even if the spreadability is not so good, and at the same time the high-temperate and high-humidity adhesion is improved.

According to the present invention, a method for making a metallic cord comprises
making at least two layers of at least two metallic elements including copper and zinc on the surface of a base wire,
heating the layers to cause the metallic elements thermodiffusion to transform into a primary alloy layer,
making a layer of copper on the primary alloy layer,
drawing the wire provided with the primary alloy layer and outer copper layer into a metallic wire through dies so that the outer copper layer is diminished during passing through the dies, and a secondary alloy layer is formed as a result of transformation of the primary alloy layer and the outer copper layer which is caused by frictional heat during passing through the dies.

Here, the metallic "cord" means both of a single filament or wire and a plurality filaments or wires which are twisted together.

Embodiments of the present invention will now be described in detail in conjunction with the accompanying drawings.

According to the present invention, a metallic cord is manufactured as follows.

Figure 1:
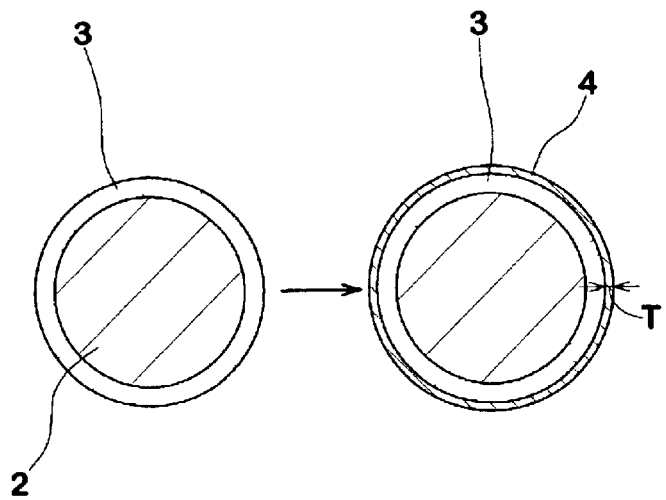
FIG. 1 is a diagram for explaining a process of making a metallic wire coated with a primary alloy layer and an outer copper layer.

First, as shown in FIG. 1, a base wire 2 is provided on the entirety of the surface thereof with a primary layer 3 of an alloy of at least copper and zinc, and then a layer 4 of copper is formed as the outmost layer on the primary layer 3.

Figure 2:
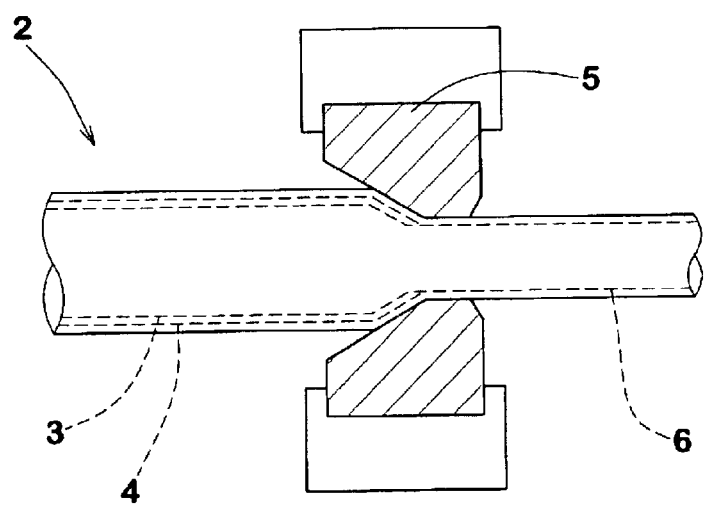
FIG. 2 is a schematic cross views of one of dies for explaining the first drawing process.
Figure 3:
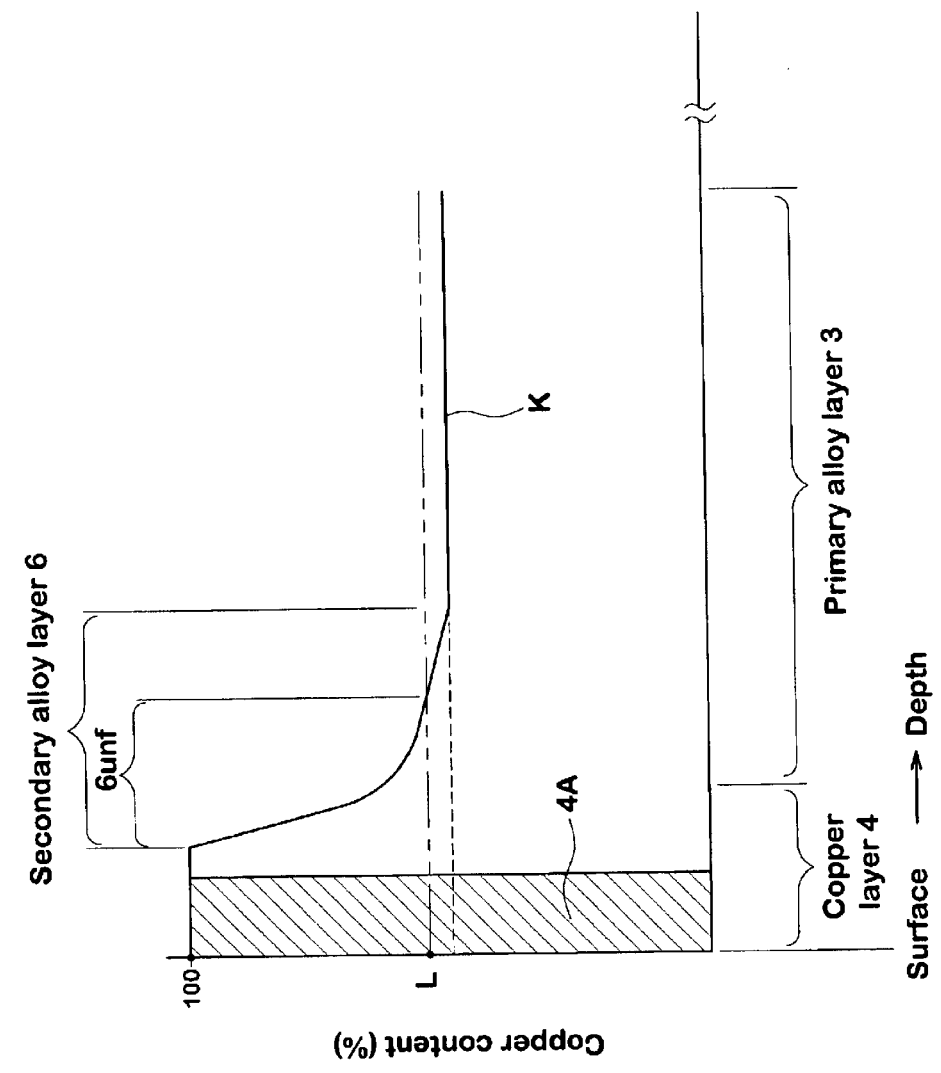
FIG. 3 is a diagram showing the copper content as a function of the depth from the wire surface at an initial stage of wire drawing.

Then, the wire 2 coated with the primary alloy layer 3 and copper layer 4 is drawn as shown in FIG. 2, using a plurality of dies 5, so that by the frictional heat during passing through at least the first die 5, the primary alloy layer 3 and outer copper layer 4 cause thermodiffusion and these are transformed into a secondary alloy layer 6 which is higher in the copper content K than the primary alloy layer 3 as shown in FIG. 3 to reduce the drag during drawing the wire 2, and the outer copper layer 4 is gradually diminished during passing through the dies 5. For example, an outer part 4A of the copper layer 4 is worn away at the initial stage of the wire drawing, and after passing through the final die 5, a substantial portion 4A of the outer copper layer 4, preferably, the entirety 4 is worn away.

As the copper layer 4 which is superior in spreading is provided as the outmost layer, this layer functions as lubricant between the die and base wire, therefore, even if the primary alloy layer 3 is of a relatively low copper content and the spreadability is not good, the drag during passing through the dies, especially dies located upstream such as the first and second dies, becomes decreased and the drawability is improved. Here, the reduction of area is preferably in the range of from 90 to 98%.

At such initial stage of wire drawing, the copper layer 4 and the primary alloy layer 3 are heated by the frictional heat, and thermodiffusion is first caused around the boundary between the primary alloy layer 3 and copper layer 4 and spreads towards each side of the boundary, and as shown in FIG. 3, the boundary portion is transformed into a secondary alloy layer 6 which is different from the primary alloy layer 3. In other words, the copper in the secondary alloy layer 6 has a gradient distribution such that the copper content increases towards the outside from the copper content of the primary alloy layer 3.

As the drawing process progresses, the outer copper layer 4 is gradually worn away. Even if the outer part 4A of the outer copper layer 4 where the copper content is 100% is worn away and as a result the secondary alloy layer 6 comes into contact with the die, the effect on improving the drawability may be maintained until the final stage of the wire drawing because the secondary alloy layer 6 has a higher copper content in its periphery and the rate of change in the reduction of area decreases as the drawing progresses. If a portion 6unf where the copper content is higher than the allowable level L remains after the drawing is finished, it is preferable to remove such portion by electrolysation or the like.

If the thickness T of the copper layer 4 is more than 0.10 micrometers, there is a high possibility that the copper layer 4 or unfavorable high-copper-content portion 6unf can not be fully worn away and therefore it is necessary to remove such unfavorable portion 6unf after the drawing. If the thickness T is less than 0.001 micrometers, it is almost impossible to improve the drawability. Therefore, the thickness T of the copper layer 4 is preferably set in the range of from 0.001 to 0.10 micrometers, more preferably not less than 0.005 micrometers but less than 0.02 micrometers.

The copper layer 4 can be formed by means of electroplating, specifically pulling through or dipping into a copper-plating solution bath such as copper pyrophosphate bath and copper sulfate bath.

The metallic wire made as above can be used alone as a monofilament cord. Further, it can be used as a multifilament cord of a plurality of metallic wires which are gathered by for example twisting them together or wrapping with another thin wire. Further, in case of a multifilament cord, one or more wires may be waved. Also in case of a monofilament cord, the wire may be waved before used as cord.

In conjunction with the accompanying drawings, two embodiments will now be described in detail. In the following embodiments, the base wire 2 is a steel wire.

Embodiment 1

In this embodiment, the primary layer 3 is made of an alloy of copper and zinc, namely, brass. Such brass layer 3 can be formed as follows.

Figure 4:
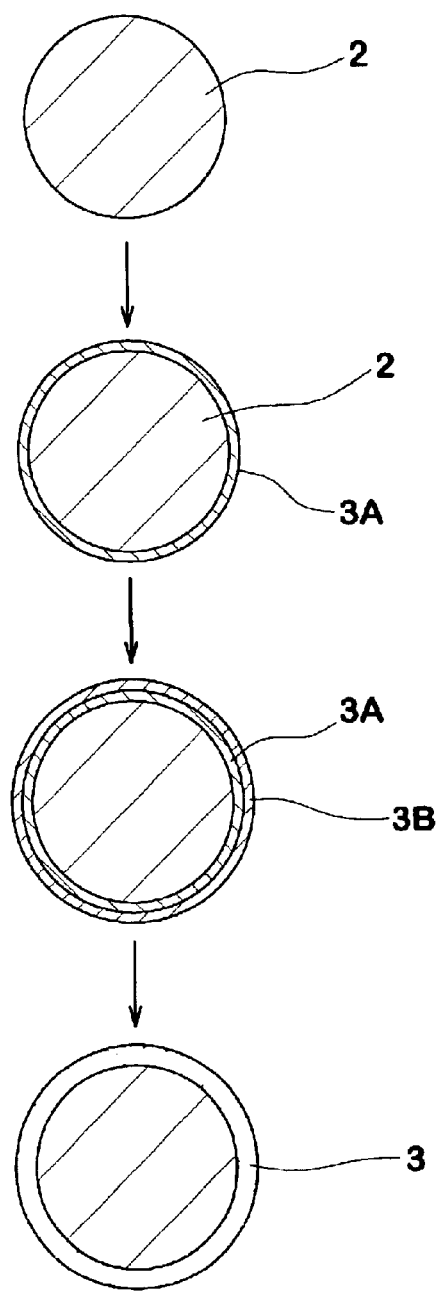
FIG. 4 is a diagram for explaining a process of forming the primary alloy layer made of two elements Cu and Zn.

As shown in FIG. 4, a base wire 2 is first provided with a copper layer 3A on the surface of the base wire 2 and then a zinc layer 3B is provided on the copper layer 3A. The copper layer 3A is formed by means of plating, specifically by pulling the base wire 2 through a copper-plating solution bath such as copper pyrophosphate bath and copper sulfate bath. Also the zinc layer 3B is formed by means of plating, specifically by pulling the copperized wire 2 through a zinc-plating solution bath such as zinc sulfate bath. Thereafter, using electric heating, high-frequency induction heating, fluidized-bed hot oven or the like, the wire 2 coated with the copper layer 3A and outer zinc layer 3B is heated up to about 550 deg. C for example so that the copper and zinc cause thermodiffusion, and the copper layer 3A and zinc layer 3B are transformed into a layer of an alloy of copper and zinc, namely, brass layer 3. Thus, it is not always necessary that the zinc layer 3B is outside the copper layer 3A. It may be also possible to first galvanize and then copperize.

The wire 2 coated with the brass layer 3 is provided with an additional copper layer 4 on the surface of the brass layer 3.

The copper layer 4 can be formed as explained above, but in the above-mention heating process of causing the thermodiffusion, if the surface of the brass layer 3 is oxidized, the oxide film is removed prior to forming the copper layer 4 for example by dipping the wire into diluted sulphuric acid.

The wire 2 coated with the brass layer 3 and outer copper layer 4 is drawn using dies 5, for example eighteen dies 5 until the target size.

In this embodiment, if the content of copper in the brass layer 3 is less than 50 weight %, it is difficult for even the outermost copper layer to reduce the drag during drawing and improving the drawability. If the copper content is more than 62 weight %, the high-temperate and high-humidity adhesion becomes worse. Therefore, the copper content is set in the range of not more than 62 weight %. Thus, in this embodiment, the above-mentioned allowable level L becomes about 63 weight %. From the viewpoint of the adhesion under hot and high humidity conditions, it is more preferably set in the range of from 50 to 60 weight %. The rest is accordingly zinc content.

Comparison Test 1

Metallic wires were made as follows.

(1) 1.25 mm dia. steel wire was coated with a copper layer by dipping the wire into a copper pyrophosphate bath.
(2) The copperized wire was coated with a zinc layer by dipping the wire into a zinc sulfate bath.
(3) The wire coated with copper and zinc was heated to transform the copper and zinc layers into a primary brass layer.
(4) The wire was dipped into diluted sulphuric acid to remove the oxide film covering the primary brass layer.
(5) In Ex.1 to Ex.3, Ref.2 and Ref.3, the wire covered with the primary brass layer was dipped into a copper pyrophosphate bath to form the outermost copper layer (0.001 to 0.015 micrometers). But in case of Ref.1, the copper layer was not provided (thickness=0).
(6) Then, using eighteen dies, the wire was drawn into a metallic wire having a diameter of 0.27 mm. (reduction of area 95.3%)

Wire Drawing Test

During drawing the wire, drawability of the wire was evaluated. The results are indicated in Table 1 using an index based on Ref.1 being 100, wherein the larger the index number, the better the wire drawability.

Adhesion Test

Further, a steel cored (1×3 structure) was made by twisting three metallic wires together. Then, to make test material for use in adhesion test under hot and high humidity conditions, the cords were sandwiched between unvulcanized rubber sheets and they were heated to vulcanized the rubber. Then the test materials were put in an oven (temperature 80 deg.C, relative humidity 95%) for five days. Thereafter the materials were subjected to peeling test. The evaluation standards are as follows.

5: cord was thoroughly covered with rubber
4: there are 3 to 6 uncovered spots
4: there are 13 to 20 uncovered spots
2: there are more than 20 uncovered spots but more than 60% area was covered
1: less than 30% area was covered with rubber Intermediate values mean in-between accordingly. The test the wire 2 which is coated with the three layers 3A. 3B and 3C is heated up to for example about 550 deg.C so that the copper, zinc and nickel cause thermodiffusion and the copper, znc and nickel layers 3A, 3B and 3C are transformed into a layer of an alloy of these three elements Cu, Zn and Ni. (hereinafter the "primary tri-element-alloy layer 3")

TABLE 1

| Cord | Ref.1 | Ref.2 | Ref.3 | Ex.1 | Ex.2 | Ex.3 |
|---|---|---|---|---|---|---|
| Primary alloy layer | | | | | | |
| Copper (weight %) | 63 | 63 | 60 | 60 | 60 | 55 |
| Zinc (weight %) | 37 | 37 | 40 | 40 | 40 | 45 |
| Coating mass (g/Kg) | 4.2 | 4.2 | 4.2 | 4.2 | 4.2 | 4.2 |
| Outermost copper layer | | | | | | |
| Thickness T (micrometer) | 0 | 0.01 | 0.15 | 0.05 | 0.01 | 0.01 |
| Copper layer remaining after drawing | — | none | re-mained | none | none | none |
| Drawability | 100 | 105 | 103 | 102 | 102 | 101 |
| High temp. & high RH Adhesion | 2.8 | 2.6 | 2.7 | 3.8 | 3.9 | 4.1 |

From the tests, it was confirmed that the wire drawability and the high-temperature and high-humidity adhesion can be improved although the primary alloy layer or brass layer is reduced in the copper content.

Embodiment 2

In this embodiment, the primary alloy layer 3 is an alloy of copper, zinc and nickel. Such alloy layer 3 can be formed as follows.

Figure 5:
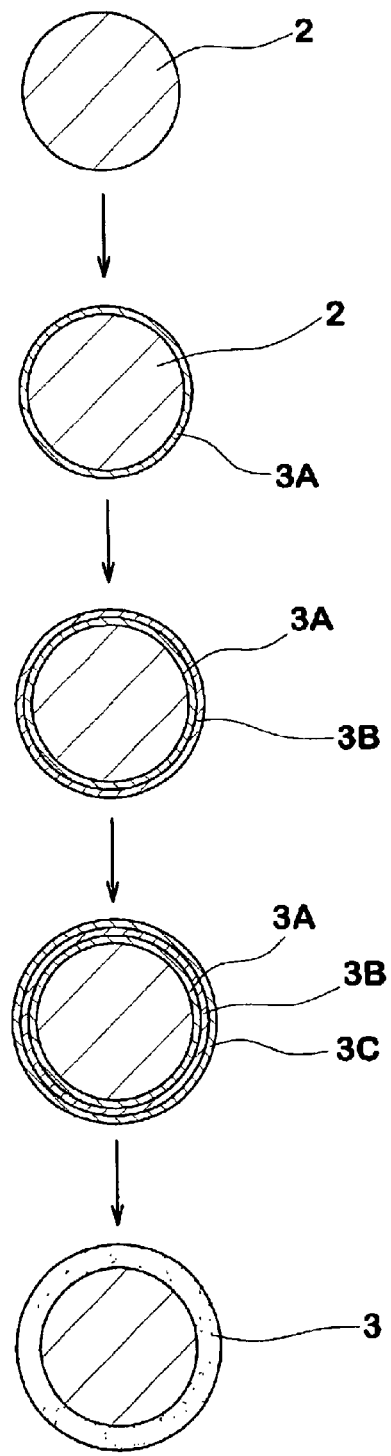
FIG. 5 is a diagram for explaining a process of forming the primary alloy layer made of three elements Cu, Zn and Ni.

As shown in FIG. 5, a base wire 2 is provided with a copper layer 3A on the surface of the base wire 2 and then a zinc layer 3B is provided on the copper layer 3A and further a nickel layer 3C is provided on the zinc layer 3B. The copper layer 3A and zinc layer 3B are formed in the same way as the above-mentioned embodiment. The nickel layer 3C is also formed by means of plating, specifically by pulling the wire 2 through a nickel-plating solution bath such as nickel sulphate bath. Thereafter, in the same way as the above-mentioned embodiment, the wire 2 which is coated with the three layers 3A, 3B and 3c is heated up to for example about 420 deg.C, so that the copper, zinc and nickel cause thermodiffusion and the copper, zinc and nickel layers 3A, 3B and 3C are transformed into a layer of an alloy of these three elements Cu, Zn and Ni. (hereinafter the "primary tri-element-alloy layer 3")

In this embodiment, the plating of three elements is made in the order of "copper, zinc and nickel" as explained above, but it is also possible to employ another order, e.g. "nickel, zinc and copper", "copper and two element plating of zinc plus nickel", "two element plating of zinc plus nickel and then copper" and the like.

If the surface of the primary tri-element-alloy layer 3 is oxidized, the oxide film is removed, and then an additional copper layer 4 is formed on the surface of the layer 3 as explained above.

The wire 2 coated with the primary tri-element-alloy layer 3 and outer copper layer 4 is drawn using dies 5, for example eighteen dies 5 until the target size.

In this embodiment, unlike the former embodiment 1, the primary alloy layer 3 may have a relatively high copper content owing to the inclusion of nickel. However, if the copper content is more than 75%, then copper which reacts with sulfur in rubber during vulcanizing the rubber increases and as a result, heat resistance and high-temperature and high-humidity adhesion deteriorate. If the copper content is less than 60%, then copper which reacts with sulfur in rubber during vulcanizing the rubber becomes insufficient for improving the initial adhesion. Thus, in this embodiment, the above-mentioned allowable level L becomes about 76%. Further, if the nickel content is less than 4%, then it is difficult to improve the heat resistance and the high-temperature and high-humidity adhesion. If the nickel content is more than 14%, then the initial adhesion becomes worse.

Therefore, it is preferable that the primary tri-element-alloy layer 3 has a copper content of from 60 to 75 weight % and a nickel content of from 4 to 14 weight %. The rest is accordingly zinc content.

If these conditions are not satisfied, it is difficult to improve the drawability, high-temperature and high-humidity adhesion and initial adhesion at the same time.

Comparison Test 2

Metallic wires were made as follows.

(1) 1.25 mm dia. steel wire was coated with a copper layer by dipping the wire into a copper pyrophosphate bath.
(2) The copperized wire was coated with a zinc layer by dipping the wire into a zinc sulfate bath.
(3) Further, the wire was coated with a nickel layer by dipping the wire into a nickel sulphate bath.
(4) The wire coated with copper, zinc and nickel was heated to transform the three layers into a primary tri-element-alloy layer.
(5) The wire was dipped into diluted sulphuric acid in order to remove the oxide film.
(6) In Ex.1 to Ex.3, Ref.2 and Ref.3, the wire covered with the primary alloy layer was dipped into a copper pyrophosphate bath to form the outermost copper layer. But in case of Ref.1, the copper layer was not provided.
(7) Then, using the eighteen dies, the wire was drawn into a metallic wire having a diameter of 0.27 mm.

Using those metallic wires, drawing test and adhesion test was conducted as explained above. Further, in order to evaluate initial adhesion, test materials made as above were subjected to peeling test without being put under hot and high humidity conditions, wherein the same evaluation standards were used. The test results are shown in Table 2 together with the high-temperature and high-humidity adhesion.

TABLE 2

| Cord | Ref.11 | Ref.12 | Ref.13 | Ex.11 | Ex.12 | Ex.13 |
| --- | --- | --- | --- | --- | --- | --- |
| Primary alloy layer | | | | | | |
| Copper (weight %) | 63 | 63 | 63 | 63 | 63 | 63 |
| Zinc (weight %) | 30 | 30 | 17 | 30 | 30 | 26 |
| Nickel (weight %) | 7 | 7 | 20 | 7 | 7 | 11 |
| Outermost copper layer | | | | | | |
| Thickness T (micrometer) | 0 | 0.20 | 0.05 | 0.05 | 0.01 | 0.01 |
| Copper layer remaining after drawing | — | remained | none | none | none | none |
| Rubber (see Table 3) | A | A | A | A | A | B |
| Drawability | 100 | 102 | 101 | 103 | 102 | 102 |
| Adhesion | | | | | | |
| high temp.& high RH | 2.8 | 2.6 | 3.6 | 3.6 | 3.7 | 3.7 |
| Initial stage | 3.7 | 3.5 | 3.1 | 3.9 | 3.9 | 3.7 |

TABLE 3

| | (PHR) | |
| --- | --- | --- |
| Rubber | A | B |
| Natural rubber | 100 | 100 |
| Hydrozincite | 10 | 10 |
| Stearic acid | 1 | 1 |
| Carbon black HAF | 65 | 60 |
| Age resistor *1 | 2 | 2 |
| Sulfur | 5 | 5 |
| Vulcanization accelerator *2 | 1 | 1 |
| Cobalt naphthenate | — | 2 |

*1 2,2,4-trimethyl-1,2-dihydroquinoline polymer
*2 N,N'-dicyclohexyl-2-benzothiazylsulfenamide Form the test results, it was confirmed that the wire drawability, initial adhesion and high-temperature and high-humidity adhesion can be improved.

What is claimed is:

1. A method for making a metallic cord made up of one or more metallic wires, comprising making at least two layers of at least two metallic elements including copper and zinc on the surface of a base wire, heating the layers to cause the metallic elements thermodiffusion to transform into a primary alloy layer, making a layer of copper on the primary alloy layer, drawing the wire provided with the primary alloy layer and outer copper layer into a metallic wire through dies so that the outer copper layer is diminished during passing through the dies, and a secondary alloy layer is formed as a result of transformation of the primary alloy layer and the outer copper layer which is caused by frictional heat during passing through the dies.

2. A method according to claim 1, wherein the outer copper layer has a thickness in a range of from 0.001 to 0.10 micrometers.

3. A method according to claim 1, wherein the outer copper layer has a thickness in a range of not less than 0.005 micrometers but less than 0.02 micrometers.

4. A method according to claim 1, wherein said at least two layers are a layer of copper and a layer of zinc, and said primary alloy layer has a copper content of from 50 to 60 weight %.

5. A method according to claim 1, wherein said at least two metallic elements are copper, zinc and nickel, said primary alloy layer has a copper content of from 60 to 75 weight % and a nickel content of from 4 to 14 weight %.

6. A method according to claim 1, wherein said metallic cord is made up of a plurality of the metallic wires, and the method further comprises twisting the metallic wires together into the cord.

* * * * *